US007999974B2

(12) United States Patent
Tanaka

(10) Patent No.: US 7,999,974 B2
(45) Date of Patent: Aug. 16, 2011

(54) IMAGE PROCESSING APPARATUS, IMAGE PROCESSING METHOD, IMAGE PROCESSING PROGRAM AND IMAGE PROCESSING SYSTEM FOR PREVENTING DOCUMENT FORGERY

(75) Inventor: Kunihiko Tanaka, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 928 days.

(21) Appl. No.: 11/948,516

(22) Filed: Nov. 30, 2007

(65) Prior Publication Data

US 2008/0130999 A1 Jun. 5, 2008

(30) Foreign Application Priority Data

Nov. 30, 2006 (JP) ................................ 2006-323064

(51) Int. Cl.
*H04N 1/40* (2006.01)

(52) U.S. Cl. ..................................... 358/3.28; 358/1.18

(58) Field of Classification Search .................. 358/1.1, 358/1.9, 3.28, 1.15, 1.18, 450, 540
See application file for complete search history.

(56) References Cited

U.S. PATENT DOCUMENTS 7,609,415 B2 * 10/2009 Miki et al. .................. 358/3.28

FOREIGN PATENT DOCUMENTS

| | | | |
|---|---|---|---|
| JP | 7-087297 | A | 3/1995 |
| JP | 11-168705 | A | 6/1999 |
| JP | 2003-234886 | A | 8/2003 |
| JP | 2004-164538 | A | 6/2004 |

* cited by examiner

*Primary Examiner* — Thomas D Lee
(74) *Attorney, Agent, or Firm* — Westerman, Hattori, Daniels & Adrian, LLP

(57) ABSTRACT

An information acquisition part 21 acquires fluctuation information fluctuating in real time, such as a time at the time of acquiring information. The write position setting part 23 obtains a write position of a tracing pattern 5 in image data based on the fluctuation information obtained by the information acquisition part 21. The image processing part 13 applies image processing to the input image data, with the information specific to the apparatus turned into a tracing pattern and written in the write position. Therefore, by adding an anti-copying tracing pattern to different positions in the individual pages of the image data, the tracing pattern can be made hardly recognized.

12 Claims, 5 Drawing Sheets

IMAGE PROCESSING APPARATUS, IMAGE PROCESSING METHOD, IMAGE PROCESSING PROGRAM AND IMAGE PROCESSING SYSTEM FOR PREVENTING DOCUMENT FORGERY

BACKGROUND

1. Technical Field

The present invention relates to an image processing apparatus, an image processing method, an image processing program, and an image processing system, and relates to the image processing apparatus, the image processing method, the image processing program, and the image processing system suitable for being used in a copy machine or a multi function peripheral (MFP) having this function.

2. Background Art

In recent years, a digital color copy machine with high image quality capable of copying an image faithful to an original image has been put into practical use. Therefore, there is a risk of forgery of paper currencies or securities by copying them with high image quality.

As a countermeasure against such a forgery, a symbol image pattern of the paper currencies or securities, etc, is previously stored in the copy machine, and when image data read from the paper currencies or securities set on a manuscript platen is identical to its stored symbol image pattern, a function of stopping a copying operation or preventing a normal copying operation is considered.

However, a large storage capacity is required for storing symbol image data of all paper currencies or securities, thereby prolonging a processing time, and an execution is likely to be difficult. Further, if new paper currencies or securities appear, illegal copying can not be prevented, thus making it difficult to cope with such a situation by a conventional technique.

Therefore, there is provided a technique in which information for specifying a manufacturer's model name of a machine used in copying, serial numbers, and time and date of making a copy, is turned into a tracing pattern, and this pattern is printed on a copy itself with an ink hardly visible to human eyes normally. The machine used in a copying object can be specified later, and therefore such a technique is indirectly useful for preventing the forgery of the paper currencies or securities.

For example, as shown in FIG. 5, this is a technique in which a tracing pattern 5 consisting of small (such as 1 pixel) dots is disposed in symbol image data 3 of a paper currency 1, and image data 3 including this tracing pattern 5 is printed on a copying paper.

Note that in order to suppress to minimum a deterioration of an output image due to addition, the tracing pattern 5 is generally printed by using a yellow color material.

Japanese Patent Laid Open Publication No. 2003-234886 (Patent document 1) is given as such a technique.

According to this patent document 1, a forming area of a tracing dot pattern is divided in accordance with the contents of the tracing information, dots of a large size are added to an area indicating the most important start mark or maker ID, dots of a medium size are added to an area indicating individual ID such as a serial number important next and dots of a small size are added to the other information area. Consequently a trace pattern is added so that more important information can be easily detected while suppressing the deterioration of picture quality, and a forgery prevention effect is improved.

Further, Japanese Patent Laid Open Publication No. 06-62217 (Patent document 2) is also proposed.

According to the patent document 2, a modulating unit modulates a symbol pattern outputted from a symbol pattern generating unit corresponding to the intensity of an image signal, and this modulated symbol pattern and the image signal are synthesized by a synthesizing unit. By modulating the added symbol pattern corresponding to the intensity of the image signal, the symbol pattern is added so as not to be hidden in the image signal in the copied image, thus preventing the forgery of the paper currencies, etc.

However, in the aforementioned patent document 1 and the patent document 2, the tracing pattern is added at a determined position in each image data or the image signal. Therefore, even if the addition of a pattern is performed in a hardly visible form, it can be easily judged that some sort of information is added to the image, if the image processed by printing or the like is analyzed.

Therefore, there is a problem that alteration is performed in anticipation of such a case, so that the image data such as masking an added position of the tracing pattern is previously prepared and the tracing pattern is made hardly recognized.

SUMMARY OF THE INVENTION

In order to solve the above-described problem, the present invention is provided, and an object of the present invention is to provide an image processing apparatus, an image processing method, an image processing program, and an image processing system capable of adding a prescribed pattern image at different positions in the individual pages of the image data, and adding a tracing pattern which is hardly altered.

In order to solve the above-described problem, the image processing apparatus of the present invention includes an image processing part that applies image processing to input image data, with the information specific to the apparatus turned into a prescribed pattern and written in a prescribed write position; an information acquisition part that acquires fluctuation information fluctuating in real time; and a write position setting part that sets the write position of the pattern in the image processing part based on the fluctuation information obtained by this information acquisition part.

An image processing method according to the present invention includes:

image acquisition processing to acquire the fluctuation information fluctuating in real time;

write position setting processing to set in the input image data the write position in which information specific to the apparatus is tuned into a prescribed pattern and is written, based on the fluctuation information obtained by this information acquisition processing;

write processing to write the pattern in the write position obtained by this write position setting processing; and image processing to apply image processing to the image data in which the pattern is written.

An image processing program according to the present invention makes a computer for image processing that applies image processing to the input image data, with the information specific to the apparatus turned into a prescribed pattern and written in a prescribed position, execute processing such as:

image processing to apply image processing to the image data, with the pattern written in a prescribed write position;

information acquisition processing to acquire the fluctuation information fluctuating in real time; and write position setting processing to set the write position of the pattern in the image processing, based on the fluctuation information obtained by this information acquisition processing.

An image processing system according to the present invention is the image processing system composed of a first image processing apparatus for processing the image data, and a second image processing apparatus for transmitting the image data to the first image processing apparatus via a network, the first image processing apparatus including: a communication part that receives the image data from the second image processing apparatus via the network; an image processing part that applies image processing to the image data received and inputted by this communication part, with the information specific to the apparatus turned into a prescribed pattern and written in a prescribed position; an information acquisition part that acquires the fluctuation information fluctuating in real time; and a write position setting part that sets the write position of the pattern in the image processing part based on the fluctuation information obtained by this information acquisition part, and the second image processing apparatus including: a data preparation part that prepares the image data; and a communication part that transmits the image data to the first image processing apparatus via the network.

According to the present invention, the write position can be set, with an image drawing start position of an image area for the image data set as a reference.

Also, according to the present invention, time at the time of acquiring the information can be set as the fluctuation information.

According to the present invention, a count value counted in the apparatus at the time of acquiring the information can be set as the fluctuation information.

According to the present invention, a value obtained from a random number unit at the time of acquiring the information can be set as the fluctuation information.

As described above, according to the image processing apparatus of the present invention, in the image processing method and the image processing program, the fluctuation information fluctuating in real time is acquired, the write position of the pattern for the image data is set based on this fluctuation information, and the image processing is applied to the input image data, with the information specific to the apparatus turned into the pattern and written in the write position. Therefore, the tracing pattern can be added to different positions in the individual pages of the image data, thus making it possible to add the tracing pattern that can be hardly altered.

According to the present invention, the write position is set, with the image drawing start position of the image area for the image data set as a reference. Therefore, the image drawing start position is fixed in many cases, and a setting of the write position to be changed can be easily calculated.

According to the present invention, the time at the time of acquiring the information is set as the fluctuation information. Therefore, the acquisition of the fluctuation information is easy.

According to the present invention, the count value counted in the apparatus at the time of acquiring information is set as the fluctuation information. Therefore, for example, a count value of the number of sheets to be copied loaded in the apparatus can be used, thus making it easy to acquire the fluctuation information.

According to the present invention, the fluctuation information can be obtained from the random number unit at the time of acquiring the information. Therefore, the fluctuation information fluctuating in real time can be formed by software.

DETAILED DESCRIPTION OF THE INVENTION BASED ON SPECIFIC EXAMPLES

Preferred embodiments of an image processing apparatus according to the present invention will be explained hereunder, with reference to the drawings. Note that an image processing method and an image processing program according to the present invention will be explained in a process of explaining the image processing apparatus.

Figure 1:
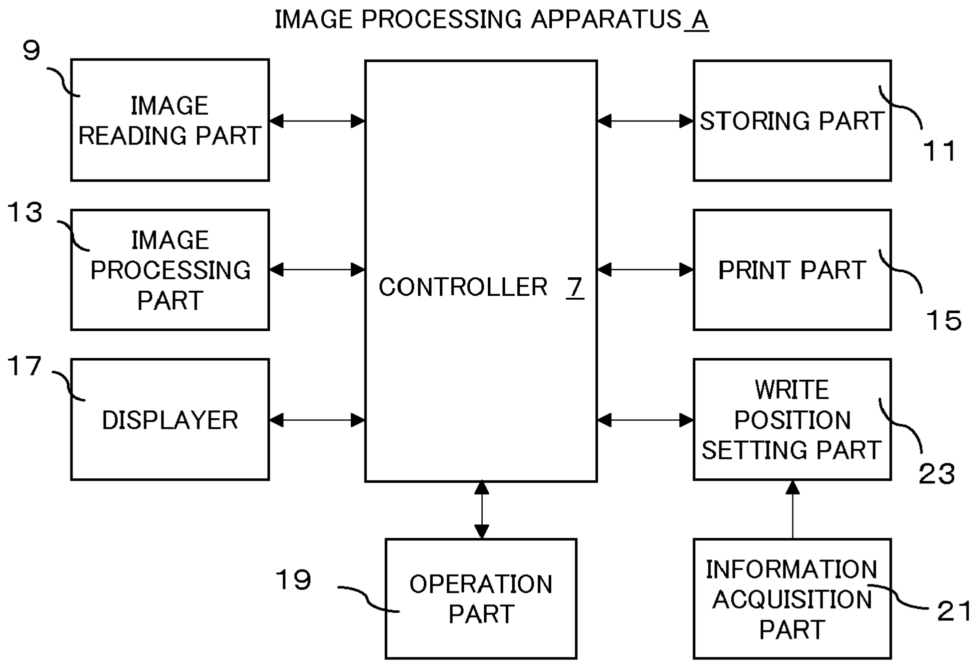
FIG. 1 is an outlined block diagram showing an embodiment of an image processing apparatus according to the present invention.

FIG. 1 is an outlined block diagram showing an embodiment of the image processing apparatus according to the present invention. In FIG. 1, the image processing apparatus of the present invention includes an image reading part 9, a storing part 11, an image processing part 13, a print part 15, a displayer 17, an operation part 19, an information acquisition part 21, and a write position setting part 23, and so forth, with a controller 7 set in a center, and functions, for example, as a copy machine or a multi function peripheral.

Under a control of the controller 7, the image reading part 9 is a data input part of a publicly-known scanner, etc, that optically reads image data from a printed manuscript of a plurality of pages, applies filter processing, magnification processing, γ-processing, and tone processing to this image data, and generates electronic image data. The image data thus generated is sequentially stored in the storing part 11 for each page of the manuscript.

In some cases, the image reading part 9 has an automatic paper feeding mechanism automatically feeding and reading the manuscript of a plurality of pages. However, the automatic paper feeding mechanism is a publicly-known matter and therefore a function thereof is not shown in the figure and the explanation therefore is omitted.

Under the control of the controller 7, the storing part 11 is, for example, a hard disc (HDD) that readably stores image data from the image reading part 9, etc, and a tracing pattern and so forth as will be described later.

Figure 5:
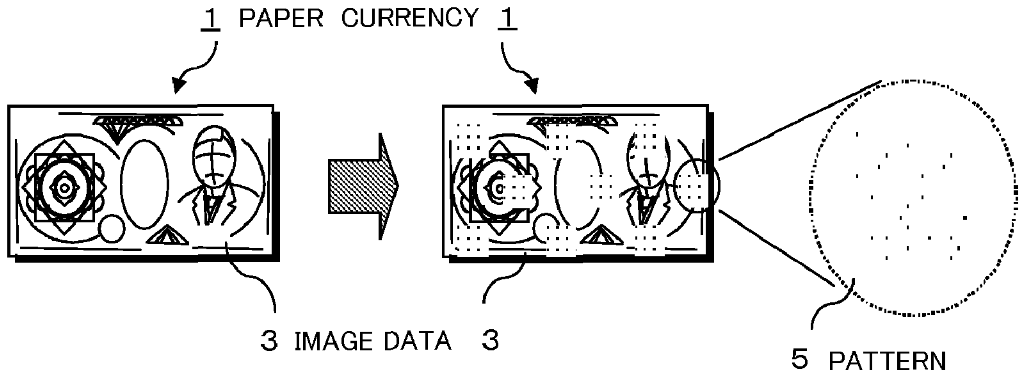
FIG. 5 is a view explaining a conventional arrangement of a tracing pattern.

As shown in FIG. 5 described above, the tracing pattern is obtained by turning information specific to an apparatus such as a manufacturer's mode name of a copy machine or a multi function peripheral, serial numbers, and time and date of making a copy, into a pattern by combining and encoding small dots (for example, composed of one pixel) within a given block.

Based on the image data stored in the storing part 11, the image processing part 13 has a function of applying image processing to the image data so as to be produced in print image data of every one page, with the tracing pattern written in a prescribed write position in such a manner as being superposed thereon, and storing this tracing pattern in the storing part 11.

The print part 15 is a publicly-known color print engine to print the print image data, etc, including the tracing pattern stored in the storing part 11, in a prescribed sequential order under the control of the controller 7.

Note that the tracing pattern is printed so as to be superposed on an image by using a yellow color material which is hardly visible to human eyes generally.

The displayer 17 is, for example, a liquid crystal display disposed in a body case of the apparatus, which displays a print processing operation circumstance and so forth under the control of the controller 7.

The operation part 19 is, for example, composed of a liquid crystal touch panel disposed in the apparatus body case (not shown), and has a function of receiving a read start instruction of the image data from the manuscript by the image reading part 9 and a write instruction of the tracing pattern to the image data by a pressing operation, etc, of a key from an outside, and is controlled by the controller 7. Note that in some cases, the operation part 19 is integrally constituted with the displayer 17.

The information acquisition part 21 acquires the fluctuation information fluctuating in real time, for example, time information of each time from a clock mechanism mounted on the apparatus, and the count value of each time generally counted by a cumulative copied sheet number counter mounted on the apparatus as information, and outputs the information thus acquired to the write position setting part 23.

Such a clock or cumulative copied sheet number counter itself is not an essential part of the present invention but is a conventionally known part, and therefore a detailed explanation therefore is omitted.

The write position setting part 23 has a function of setting the write position of the tracing pattern in the image processing part 13, based on the fluctuation information such as time obtained by the information acquisition part 21.

Figure 2:
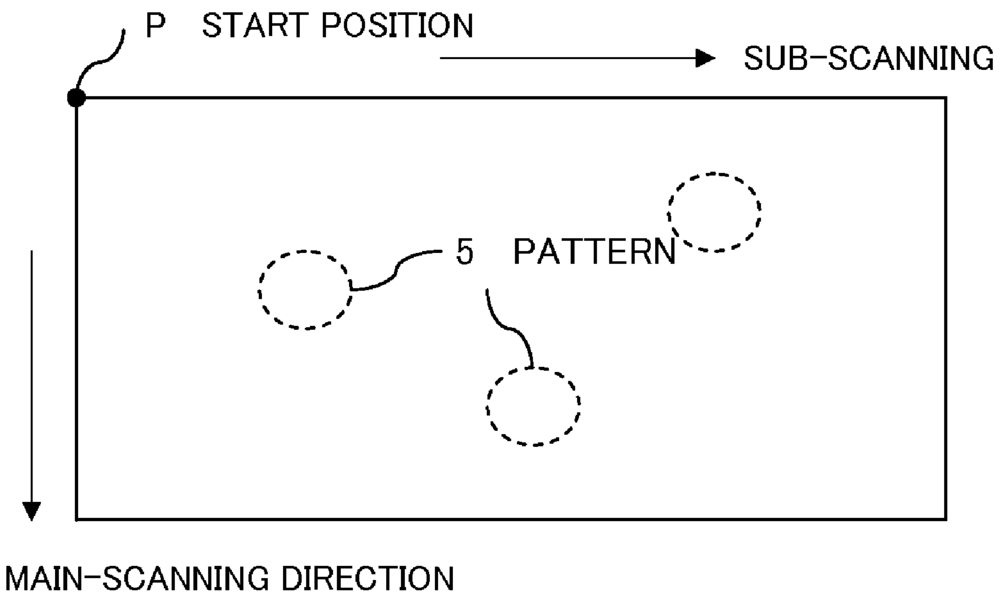
FIG. 2 is a view explaining an operation of the image processing apparatus according to the present invention.

For example, as shown in FIG. 2, when the image drawing start position (or read start position) P of one end for the image data is set as a reference, the write position (addition start position) of the tracing pattern 5 is set from a sub-scanning direction and a main-scanning direction.

For example, a position deviated from the image drawing start position P of the image area for the image data by "time×10" line in the sub-scanning direction, and deviated by "minutes×10" in the main-scanning direction is set as the addition start position of the pattern.

Specifically, when copying time is "12:25", the position deviated from the drawing start position P of the image data by 120 lines in the sub-scanning direction and deviated by 250 pixels in the main-scanning direction is set as the addition start position of the tracing pattern 5. Note that the addition start position can be repeatedly set in each page of the image data, for each interval of the acquired fluctuation information.

When the counter value of the cumulative copied sheet number counter is the fluctuation information, the position moved from the image drawing start position P of the image data by the pixel of the counter value in the main-scanning direction is set as the addition start position of the tracing pattern 5.

The controller 7 controls the image reading part 9, the storing part 11, the image processing part 13, the print part 15, the displayer 17, the operation part 19, the information acquisition part 21, and the write position setting part 23, wherein, a CPU forms a main essential part of a control operational function, and an ROM stores a program of the CPU.

Figure 3:
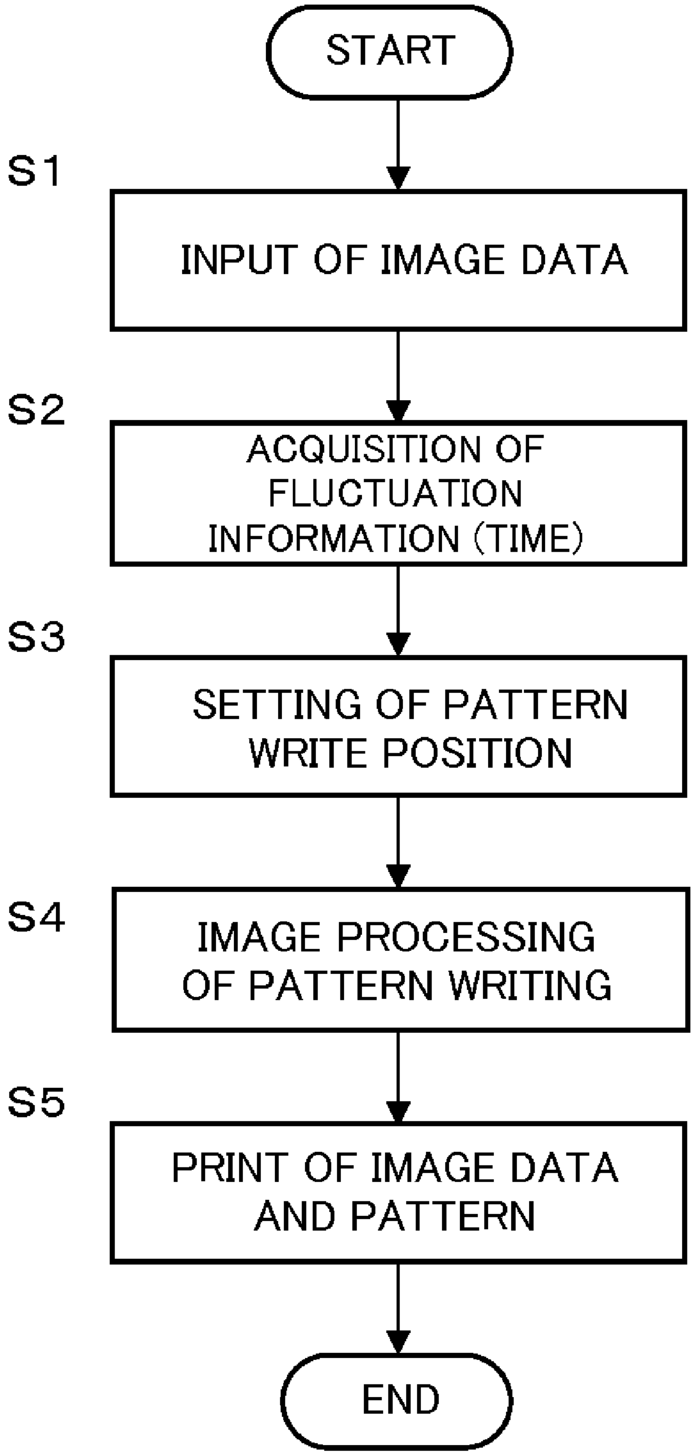
FIG. 3 is a flowchart explaining the operation of the image processing apparatus according to the present invention.

Next, an operation of the image processing apparatus according to the present invention will be briefly explained, with reference to the flowchart of FIG. 3.

When the program is started, the image data, for example, sent from the image reading part 9 is inputted and processed in step S1, and the information acquisition part 21 acquires the time at the time of inputting the image data as fluctuation information in step S2, and the write position setting part 23 executes setting processing of the write position of the tracing pattern in step S3.

As described above, when input time shows "12:25", the write position setting part 23 sets and calculates the position deviated from the image drawing start position P of the image data by 120 lines in the sub-scanning direction and deviated by 250 pixels in the main-scanning direction as the write position (addition start position) of the tracing pattern, and outputs the value thus obtained to the image processing part 13.

In the subsequent step S4, the image processing part 13 writes the tracing pattern 5 from the write position (addition start position) for the image data so as to be superposed thereon, and in step S5, the image data including the tracing pattern is printed in the print part 15 and the processing is ended.

Thus, the present invention provides the image processing method including an operation processing procedure as described above, which is executed by the image processing program of the present invention.

Thus, the image processing apparatus of the present invention includes the image processing part 13 that applies image processing to the input image data, with the information specific to the apparatus turned into a prescribed pattern and written in the image data; an information acquisition part 21 that acquires the fluctuation information fluctuating in real time such as the time at the time of acquiring the information; and the write position setting part 23 that sets the write position of the pattern in the image processing part 13 based on time information obtained by this information acquisition part 21.

Therefore, the tracing pattern 5 is added to the different positions in the individual pages of the image data, and accordingly the tracing pattern can be made hardly recognized and the tracing pattern that is hardly altered can be added.

In addition, generally the clock mechanism is built in the copy machine, etc, and accordingly acquisition of time as the fluctuation information can be extremely easy.

Further, the image drawing start position P of the image area for the image data is fixed, and accordingly it becomes easy to set the write position which is changed, with the image drawing start position P as a reference.

In the image processing apparatus of the present invention, the fluctuation information is not limited to time.

Generally, a count mechanism counting the number of copied sheets is built in the copy machine, etc. Therefore, the count value counted in the apparatus at the time of acquiring information can be set as the fluctuation information. Accordingly, in the same way, the acquisition of the fluctuation information is extremely easy.

Also, a numerical value obtained by using a random number list, etc, at the time of acquiring the information can be used as the fluctuation information. With this structure, the fluctuation information fluctuating in real time can be formed by software.

Incidentally, in the image processing apparatus of the present invention, it is possible to arbitrarily select whether an anti-copying tracing pattern 5 is added to a different position in all pages of the image data, or the tracing pattern 5 is added to the same position in a plurality of pages of the image data, depending on a method of utilizing and a method of acquiring the fluctuation information fluctuating in real time.

Also, in the image processing method and the image processing program according to the present invention, the write position, with the image drawing start position of the image area for the image data set as a reference, and the time at the time of acquiring the information, the count value counted in the apparatus, and the value obtained from a random number unit at the time of acquiring the information can be set as the fluctuation information, thus making it possible to obtain a similar advantage as that of the image processing apparatus according to the present invention.

Figure 4:
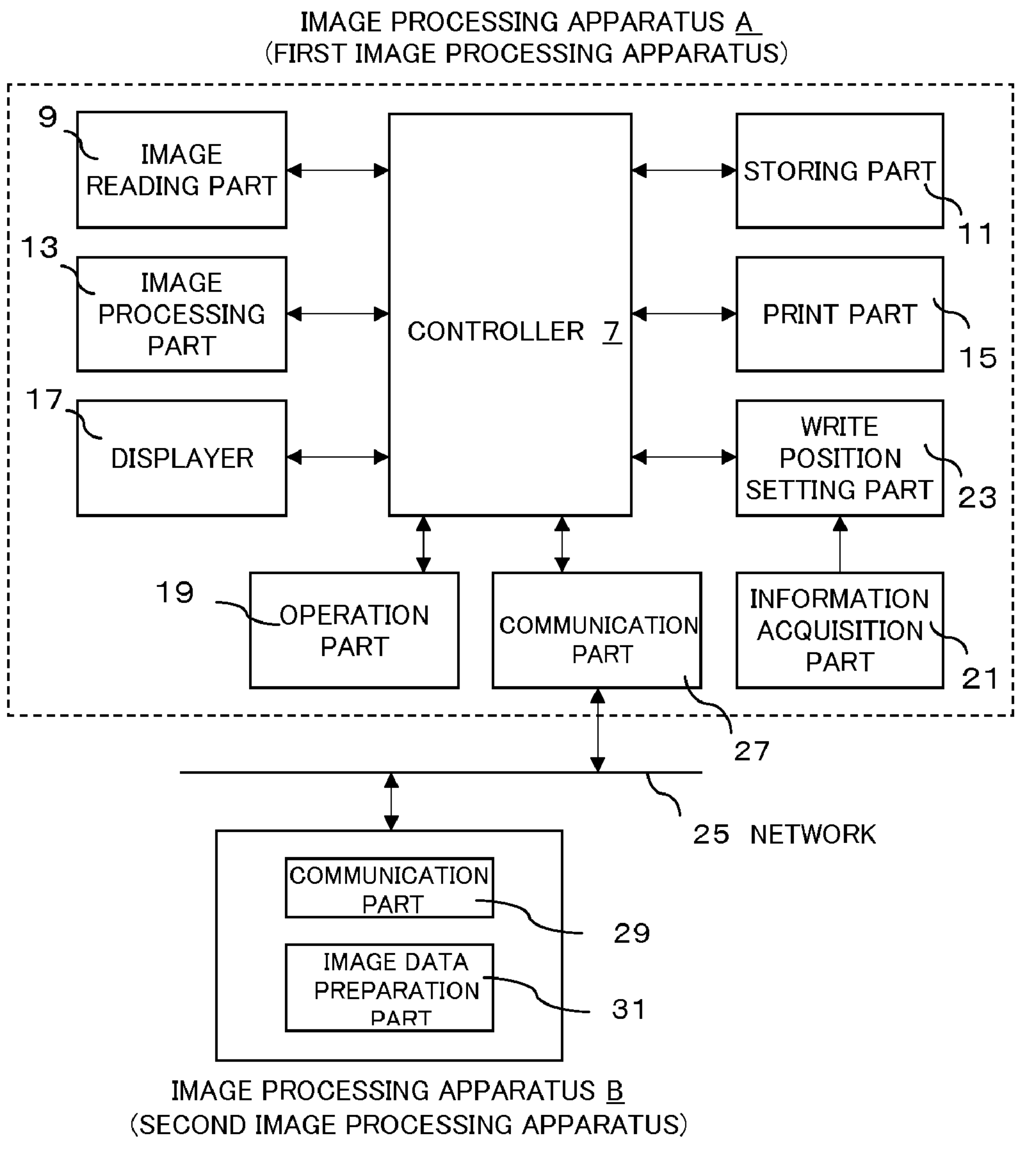
FIG. 4 is an outlined block diagram showing an embodiment of an image processing system according to the present invention.

Next, the image processing system according to the present invention will be explained, with reference to FIG. 4.

The image processing system has a structure of having a first image processing apparatus A that processes the image data, and a second image processing apparatus B that transmits the image data to the first image processing apparatus A via a network 25.

The first image processing apparatus A has a communication part 27 in addition to the structure of the aforementioned FIG. 1, and the other structure excluding the communication part 27 is the same as that of FIG. 1, and the explanation therefore is omitted.

When the image processing apparatus B is connected to the communication part 27, under the control of the controller 7, the communication part 27 serves as an interface that secures a communication state between the communication part 27 and the image processing apparatus B, receives the image data and so forth from the image processing apparatus B by using a prescribed protocol, and stores it in the storing part 11. The received image data is subjected to processing in the same way as an example of FIG. 1.

The second image processing apparatus B serves as the copy machine, the multi function peripheral, or a computer having a communication part 29 and an image data forming part 31, and so forth. The second image processing apparatus B is used as an apparatus of a manager of a system, client, or a server. Note that although the second image processing apparatus B has a structure other than the aforementioned structure, it is not an essential part of the present invention and therefore the explanation therefore is omitted.

When the image processing apparatus A is connected to the communication part 29 via a network 25, the communication part 29 serves as the interface that secures the communication state between the communication part 29 and the image processing apparatus A, and transmits the image data and so forth to the image processing apparatus A by using the aforementioned protocol.

An image data forming part 31 has a function of preparing the image data optically read from the manuscript by the image reading part not shown and the image data by an application software, and such image data is outputted to the communication part 29.

In the image processing system thus constituted, the image data transmitted to the first image processing apparatus A from the second image processing apparatus B, and the image data obtained by giving a transmission request to the second image processing apparatus B from the first image processing apparatus A, are subjected to processing as described above by the first image processing apparatus A.

Namely, in the image processing apparatus A, the image processing is applied to the image data inputted from the second image processing apparatus B, with the information specific to this first image processing apparatus A turned into a prescribed pattern and written in the aforementioned write position, and this processed image is printed. Therefore, the same advantage as the structure of FIG. 1 can be obtained.

What is claimed is:

1. An image processing apparatus, comprising:

an image processing part that applies image processing to input image data, with information specific to the apparatus turned into a prescribed pattern and written in a prescribed write position;

an information acquisition part that acquires fluctuation information fluctuating in real time; and a write position setting part that sets said write position of said pattern in said image processing part based on said fluctuation information obtained by this information acquisition part, said write position setting part sets said write position, with an image drawing start position of an image area for said image data set as a reference, wherein said information acquisition part acquires time at the time of acquiring information, as said fluctuation information.

2. The image processing apparatus according to claim 1, wherein said information acquisition part acquires a count value counted in the apparatus at the time of acquiring information, as said fluctuation information.

3. The image processing apparatus according to claim 1, wherein said information acquisition part acquires a value obtained from a random number unit at the time of acquiring information, as said fluctuation information.

4. An image processing method, comprising:

input processing to input image data;

information acquisition processing to acquire fluctuation information fluctuating in real time;

write position setting processing to set a write position in said input image data, with information specific to the apparatus turned into a prescribed pattern;

write processing to write said pattern in the write position obtained by this write position setting processing; and image processing to apply image processing to said image data in which said pattern is written, said write position setting processing sets said write position, with an image drawing start position of an image area for said image data set as a reference, wherein said information acquisition processing acquires time at the time of acquiring information, as said fluctuation information.

5. The image processing method according to claim 4, wherein said information acquisition processing acquires a count value counted in the apparatus at the time of acquiring information, as said fluctuation information.

6. The image processing method according to claim 4, wherein said information acquisition processing acquires a value obtained from a random number preparation processing at the time of acquiring information, as said fluctuation information.

7. A non-transitory computer-readable storage medium having an executable image processing program stored thereon, wherein said image processing program instructs a computer for image processing, which applies image processing to input image data, with information specific to the apparatus turned into a prescribed pattern and written in this image data, to execute processing:

image processing to apply image processing to said image data, by writing said pattern in a prescribed write position;

information acquisition processing to acquire fluctuation information fluctuating in real time; and write position setting processing to set said write position of said pattern in said image processing based on said fluctuation information obtained by this information acquisition processing, said write position setting processing sets said write position, with an image drawing start position of an image area for said image data set as a reference, wherein said information acquisition processing acquires time at the time of acquiring information, as said fluctuation information.

8. The non-transitory computer-readable storage medium having the executable image processing program according to claim 7, wherein said information acquisition processing acquires a count value counted in the apparatus at the time of acquiring information, as said fluctuation information.

9. The non-transitory computer-readable storage medium having the executable image processing program according to claim 7, wherein said information acquisition processing acquires a value obtained from a random number preparation processing at the time of acquiring information, as said fluctuation information.

10. An image processing system constituted of a first image processing apparatus that processes image data, and a second image processing apparatus that transmits said image data to said first image processing apparatus via a network, said first image processing apparatus comprising:

a communication part that receives said image data from said second image processing apparatus via said network;

an image processing part that applies image processing to image data received and inputted by this communication part, with information specific to the apparatus turned into a prescribed pattern and written in a prescribed write position;

an information acquisition part that acquires fluctuation information fluctuating in real time; and a write position setting part that sets said write position of said pattern in said image processing part based on said fluctuation information obtained by this information acquisition part, and said second image processing apparatus comprising:

a data preparation part that prepares said image data; and a communication part that transmits said image data to said first image processing apparatus via said network, said write position setting part sets said write position, with an image drawing start position of an image area for said image data set as a reference, wherein said information acquisition part acquires time at the time of acquiring information, as said fluctuation information.

11. The image processing system according to claim 10, wherein said information acquisition part acquires a count value counted in the apparatus at the time of acquiring information, as said fluctuation information.

12. The image processing system according to claim 10, wherein said information acquisition part acquires a value obtained from a random number unit at the time of acquiring information, as said fluctuation information.

* * * * *